United States Patent
Zhao

(10) Patent No.: US 12,537,623 B2
(45) Date of Patent: Jan. 27, 2026

(54) SIDELINK DATA TRANSMISSION METHOD AND TERMINAL DEVICE

(71) Applicant: GUANGDONG OPPO MOBILE TELECOMMUNICATIONS CORP., LTD., Guangdong (CN)

(72) Inventor: Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 471 days.

(21) Appl. No.: 17/879,798

(22) Filed: Aug. 3, 2022

(65) Prior Publication Data
US 2022/0376829 A1 Nov. 24, 2022

Related U.S. Application Data

(63) Continuation of application No. PCT/CN2020/080285, filed on Mar. 19, 2020.

(51) Int. Cl.
| | |
|---|---|
| H04L 1/08 | (2006.01) |
| H04L 1/1812 | (2023.01) |
| H04W 72/1263 | (2023.01) |
| H04W 72/23 | (2023.01) |

(52) U.S. Cl.
CPC .............. *H04L 1/08* (2013.01); *H04L 1/1812* (2013.01); *H04W 72/1263* (2013.01); *H04W 72/23* (2023.01)

(58) Field of Classification Search
CPC ....... H04L 1/08; H04L 1/1812; H04L 1/1822; H04L 1/1896; H04L 5/003; H04L 5/0055; H04W 72/1263; H04W 28/04
See application file for complete search history.

(56) References Cited

U.S. PATENT DOCUMENTS

| | | | |
|---|---|---|---|
| 11,950,326 B2 * | 4/2024 | Selvanesan | H04L 1/1825 |
| 12,302,361 B2 * | 5/2025 | Lee | H04L 5/0044 |
| 2015/0305015 A1 | 10/2015 | Panchal | |

(Continued)

FOREIGN PATENT DOCUMENTS

| | | |
|---|---|---|
| CN | 101547077 | 9/2009 |
| CN | 101809925 | 8/2010 |

(Continued)

OTHER PUBLICATIONS

Sony, "Resource allocation mechanism for NR sidelink Mode 2", 3GPP TSG RAN WG1 #99 R1-1912344, Nov. 18-22, 2019, pp. 1-6.

(Continued)

*Primary Examiner* — Redentor Pasia
(74) *Attorney, Agent, or Firm* — Hodgson Russ LLP

(57) ABSTRACT

The present application relates to a sidelink data transmission method and a terminal device. The sidelink data transmission method comprises: a terminal device sends, to a network device, acknowledgement information for first sidelink data; the terminal device receives first information, the first information being used for indicating the terminal device to retransmit the first sidelink data; and the terminal device retransmits the first sidelink data or does not retransmit the first sidelink data. By using the embodiments of the present application, the reasonable utilization of a resource can be realized to a certain extent.

6 Claims, 12 Drawing Sheets

(56) References Cited

U.S. PATENT DOCUMENTS

| | | | |
|---|---|---|---|
| 2019/0052436 A1 | 2/2019 | Desai et al. | |
| 2019/0268104 A1 | 8/2019 | Zou et al. | |
| 2019/0349145 A1 | 11/2019 | You | |
| 2019/0356425 A1 | 11/2019 | Dudda et al. | |
| 2020/0029318 A1* | 1/2020 | Guo | H04W 4/40 |
| 2020/0304247 A1* | 9/2020 | Loehr | H04W 72/23 |
| 2020/0314819 A1* | 10/2020 | Loehr | H04W 4/40 |
| 2020/0396024 A1* | 12/2020 | Ganesan | H04L 1/1819 |
| 2021/0006362 A1* | 1/2021 | Loehr | H04L 1/1819 |
| 2021/0368542 A1* | 11/2021 | Xue | H04W 72/23 |
| 2021/0376959 A1* | 12/2021 | Yang | H04W 72/23 |
| 2022/0173839 A1* | 6/2022 | Yoshioka | H04W 4/06 |
| 2022/0216946 A1* | 7/2022 | Liu | H04L 1/1867 |
| 2022/0416950 A1* | 12/2022 | Xu | H04L 1/1887 |
| 2023/0088550 A1* | 3/2023 | Wang | H04L 1/1822 370/329 |
| 2024/0137939 A1* | 4/2024 | Yao | H04W 72/23 |

FOREIGN PATENT DOCUMENTS

| | | |
|---|---|---|
| CN | 103888229 | 6/2014 |
| CN | 104823400 | 8/2015 |
| CN | 109120314 | 1/2019 |
| CN | 109391386 | 2/2019 |
| CN | 109792594 | 5/2019 |
| CN | 110291738 | 9/2019 |
| CN | 110291739 | 9/2019 |
| CN | 110447191 | 11/2019 |
| CN | 110447282 | 11/2019 |
| CN | 110536445 | 12/2019 |
| CN | 110582966 | 12/2019 |
| CN | 110740016 | 1/2020 |
| CN | 110832898 | 2/2020 |
| WO | 2019028916 | 2/2019 |

OTHER PUBLICATIONS

Yan-Jing Sun et al., "Survey of Self-Interference Cancellation and MAC Scheduling for In-Band Full-Duplex Wireless Communication", Journal of University of Electronic Science and Technology of China, with English abstract, Nov. 30, 2016, pp. 873-887.

"Office Action of China Counterpart Application, Application No. 202080088519.3", with English translation thereof, issued on Apr. 22, 2024, p. 1-p. 27.

"Notice of Allowance of China Counterpart Application, Application No. 202211006537.X", with English translation thereof, issued on May 11, 2024, p. 1-p. 10.

"Office Action of Europe Counterpart Application, Application No. 20925856.5", issued on Jun. 2, 2023, p. 1-p. 4.

"Office Action of China Counterpart Application, Application No. 202211006537.X", with English translation thereof, Issued on Aug. 9, 2023, p. 1-p. 17.

"International Search Report (Form PCT/ISA/210) of PCT/CN2020/080285," mailed on Dec. 21, 2020, pp. 1-4.

"Written Opinion of the International Searching Authority (Form PCT/ISA/237) of PCT/CN2020/080285," mailed on Dec. 21, 2020, pp. 1-6.

Ericsson, "On the Support of HARQ/CSI feedbacks Over Sidelink," 3GPP TSG-RAN WG2 #104, R2-1817957, Nov. 2018, pp. 1-4.

"Office Action of China Counterpart Application, Application No. 202211006537.X", with English translation thereof, issued on Oct. 12, 2023, p. 1-p. 16.

"Decision of Refusal of China Counterpart Application, Application No. 202211006537.X", with English translation thereof, issued on Dec. 15, 2023, p. 1-p. 16.

"Search Report of Europe Counterpart Application No. 20925856.5", issued on Nov. 9, 2022, pp. 1-6.

* cited by examiner

SIDELINK DATA TRANSMISSION METHOD AND TERMINAL DEVICE

CROSS-REFERENCE TO RELATED APPLICATION

This application is a continuation of international PCT application serial no. PCT/CN2020/080285, filed on Mar. 19, 2020. The entirety of the above-mentioned patent application is hereby incorporated by reference herein and made a part of this specification.

BACKGROUND

Technical Field

The present disclosure relates to the field of communications, and in particular, to a sidelink data transmission method and a terminal device.

Description of Related Art

Device to Device (D2D) and Vehicle to Everything (V2X, which may be referred to as the Internet of Vehicles) technologies are important parts of mobile communications. At present, in D2D and/or V2X scenarios, direct communication between devices is supported through sidelink (SL) transmission technology, which is different from the way in which communication data is received or sent through a base station in cellular systems. Sidelink (SL) transmission has higher spectral efficiency and lower transmission delay. Specifically, the V2X system supports two transmission modes, namely: a first mode: the transmission resources at the terminal are allocated by the base station, and the terminal performs data transmission on the sidelink according to the resources allocated by the base station. The base station may allocate resources for a single transmission to the terminal, and may also allocate resources for semi-static transmission to the terminal; a second mode: the terminal selects resources in the resource pool for data transmission.

With the continuous evolution of new air interface NR system in the next-generation mobile communication 5G, especially the rise of self-driving technology, higher requirements are set for the sidelink data interaction between multiple terminals (e.g., vehicle terminals) in the V2X system, such as higher throughput, lower latency, higher reliability, larger coverage, and more flexible resource allocation, etc. It is necessary to optimize the sidelink (SL) transmission mechanism.

SUMMARY

In view of the above problem, embodiments of the present disclosure provide a sidelink data transmission method and a terminal device, which may solve the problem caused by network device detection errors during the sidelink data transmission process.

An embodiment of the present disclosure provides a sidelink data transmission method, which is applied to a terminal device. The method includes: a terminal device transmits, to a network device, acknowledgement information for first sidelink data; the terminal device receives first information, the first information is used for instructing the terminal device to retransmit the first sidelink data; and the terminal device retransmits the first sidelink data or does not retransmit the first sidelink data.

An embodiment of the present disclosure further provides a sidelink data transmission method, which is applied to a network device, including: a terminal device transmits, to a network device, a negative acknowledgement information for the first sidelink data, the terminal device does not receive the information that the network device schedules transmission resources, and the terminal device obtains transmission resources according to a preset rule.

An embodiment of the present disclosure further provides a terminal device, including:
A transmission processing module is configured to send acknowledgement information for the first sidelink data to the network device;
A receiving processing module is configured to receive first information, and the first information is configured to instruct the terminal device to retransmit the first sidelink data;
A retransmission processing module is configured to retransmit the first sidelink data or not to retransmit the first sidelink data.

An embodiment of the present disclosure further provides a terminal device, including:
A transmission processing module is configured to send negative acknowledgement information for the first sidelink data to the network device;
A resource acquisition processing module is configured to acquire transmission resources according to a preset rule when the information that the network device schedules transmission resources is not received.

An embodiment of the present disclosure further provides a terminal device, including:
a processor and a memory. The memory is configured to store a computer program, the processor invokes and executes the computer program stored in the memory, and executes the above-mentioned sidelink data transmission method.

An embodiment of the present disclosure further provides a chip, including: a processor, configured to invoke and execute a computer program from a memory, so that a device on which the chip is used executes the above-mentioned sidelink data transmission method.

An embodiment of the present disclosure further provides a computer-readable storage medium for storing a computer program, and the computer program enables a computer to execute the above-mentioned sidelink data transmission method.

An embodiment of the present disclosure further provides a computer program product, including computer program instructions, and the computer program instructions enable a computer to execute the above-mentioned sidelink data transmission method.

An embodiment of the present disclosure further provides a computer program, and the computer program enables a computer to execute the above-mentioned sidelink data transmission method.

Considering the fact that the network device may have detection errors in practice, the embodiments of the present disclosure specify the behavior of the terminal device, especially the transmitting terminal, in the case where the network detects errors in the sidelink feedback information. By using the embodiments of the present disclosure, reasonable utilization of a resource may be realized to a certain extent.

DESCRIPTION OF THE EMBODIMENTS

Figure 1:
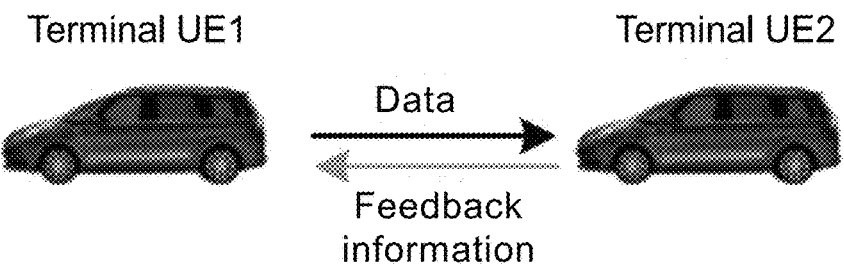
FIG. 1 is a logical schematic view of sidelink feedback in unicast transmission.

The technical solutions in the embodiments of the present disclosure will be described below with reference to the accompanying drawings in the embodiments of the present disclosure.

The technical solutions of the embodiments of the present disclosure may be applied to various communication systems, for example, a Global System of Mobile Communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), Wireless Local Area Networks (WLAN), Wireless Fidelity (WiFi), 5th-generation (5G) communication system or other communication systems, etc.

Generally speaking, conventional communication systems support a limited number of connections and are easy to implement. However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., the embodiments of the present disclosure may also be applied to these communication systems.

Optionally, the communication system in this embodiment of the present disclosure may be applied to a Carrier Aggregation (CA) scenario, a Dual Connectivity (DC) scenario, and may also be applied to a Standalone (SA) distribution scenario.

Embodiments of the disclosure describe the various embodiments in conjunction with network device and terminal device. The terminal device may also be referred to as User Equipment (UE), access terminal, subscriber unit, subscriber station, mobile station, mobile station, remote station, remote terminal, mobile device, user terminal, terminal, wireless communication device, user agent or user device, etc.

The terminal device may be a station (STAION, ST) in a WLAN, and may be a cellular phone, a cordless phone, a Session Initiation Protocol (SIP) phone, a Wireless Local Loop (WLL) station, a Personal Digital Assistant (PDA) device, handheld devices with wireless communication functions, computing devices, or other processing devices connected to wireless modems, in-vehicle devices, wearable devices, next-generation communication systems such as terminal devices in NR networks, or terminal devices in a Public Land Mobile Network (PLMN) network in future evolution, etc.

In an embodiment of the present disclosure, the terminal device may be deployed on land, including indoor or outdoor environments, handheld, wearable, or vehicle-mounted; the terminal device may also be deployed on water (such as ships, etc.); the terminal device may also be deployed in the air (such as airplanes, balloons, and satellites, etc.).

In an embodiment of the present disclosure, the terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

In an embodiment of the present disclosure, the network device may be a device for communicating with a mobile device, and the network device may be an access point (AP) in WLAN, or a base station (BTS) in GSM or CDMA, a NodeB (NB) in WCDMA, an evolutional Node B, eNB or eNodeB in LTE, or a relay station or an access point, or in-vehicle devices, wearable devices and network device (gNB) in NR networks, or network devices in the PLMN network in future evolution, etc.

As an example and not a limitation, in an embodiment of the present disclosure, the network device may have a mobile characteristic, for example, the network device may be a mobile device. Optionally, the network device may be a satellite or a balloon station. For example, the satellites may be low earth orbit (LEO) satellites, medium earth orbit (MEO) satellites, geostationary earth orbit (GEO) satellites, high elliptical orbit (HEO) satellites, and so on. Optionally, the network device may also be a base station set on land or in water, etc.

In an embodiment of the present disclosure, a network device may provide services for a cell, and a terminal device communicates with the network device through transmission resources (for example, frequency domain resources, or spectrum resources) used by the cell, and the cell may be a cell corresponding to a network device (e.g., a base station). The cell may belong to a macro base station, or may belong to a base station corresponding to a small cell. The small cells here may include: Metro cells, Micro cells, Pico cells, Femto cells, etc., and the small cells have the characteristics of small coverage and low transmission power, and are suitable for providing high-speed data transmission services.

It should be understood that the terms "system" and "network" are often used interchangeably herein. The term "and/or" herein is used to describe the association relationship of associated objects, for example, it means that there may be three relationships between the associated objects mentioned in the context. For example, A and/or B may mean: A exists alone, A and B exist simultaneously, and B exists alone. The symbol "/" in this disclosure generally indicates that the associated objects are in an "or" relationship.

In order to clearly illustrate the idea of the embodiments of the present disclosure, a brief description of the transmission process of sidelink data is described first.

In the field of the disclosure, the NR-V2X system supports two modes of resource allocation, mode 1 (which may be denoted as mode-1) and mode 2 (which may be denoted as mode-2). In mode 1, the network allocates sidelink transmission resources to the terminal, and the network may allocate sidelink transmission resources to the terminal through dynamic scheduling, or the network may also allocate a sidelink configure grant (SL CG) transmission resource to the terminal. In mode 2, the terminal autonomously selects transmission resources in the resource pool for sidelink transmission. Specifically, the resource allocation method of sidelink configure grant mainly includes two configure grant methods: type-1 configured grant (the first type of configure grant) and type-2 configured grant (the second type of configure grant).

In the NR-V2X system, in order to improve the reliability of data transmission, a sidelink feedback channel is introduced. Taking unicast transmission as an example, FIG. 1 is a schematic view of sidelink feedback in unicast transmission process, UE1 is a transmitting terminal TX UE, UE2 is a receiving terminal RX UE, and the transmitting terminal sends sidelink data to the receiving terminal. The sidelink data may include a Physical Sidelink Control Channel (PSCCH) and a Physical Sidelink Shared Channel (PSSCH). The receiving terminal sends a Hybrid Automatic Repeat reQuest (HARQ) feedback information to the transmitting terminal. The transmitting terminal determines whether retransmission is required according to the feedback information of the receiving terminal. The HARQ feedback information is carried in a sidelink feedback channel, such as a Physical Sidelink Feedback Channel (PSFCH).

The sidelink feedback may be activated or deactivated through pre-configuration information or network configuration information. If the sidelink feedback is activated, the receiving terminal receives the sidelink data sent by the transmitting terminal, and feeds back HARQ acknowledgement (ACK) or negative acknowledgement (NACK) to the transmitting terminal according to the detection result. The transmitting terminal decides to send retransmission data or new data according to the feedback information of the receiving terminal. If the sidelink feedback is deactivated, the receiving terminal does not need to send feedback information, and the transmitting terminal normally sends data through blind retransmission. For example, the transmitting terminal repeatedly sends each sidelink data multiple times, instead of deciding whether to send retransmission data according to the feedback information of the receiving terminal.

Further, in mode 1, the process of reporting the sidelink feedback information by the transmitting terminal to the network is substantially as follows: the network allocates sidelink transmission resources to the terminal. If the transmitting terminal uses the resources to transmit sidelink data that supports sidelink feedback, the receiving terminal sends the sidelink feedback information to the transmitting terminal. The transmitting terminal reports the sidelink feedback information to the network, and the network decides whether to allocate retransmission resources according to the sidelink feedback information reported by the transmitting terminal. Specifically, the network may allocate a Physical Uplink Control Channel (PUCCH) resource to the transmitting terminal, and the PUCCH transmission resource is used for the transmitting terminal to report sidelink feedback information to the network.

Figure 2:
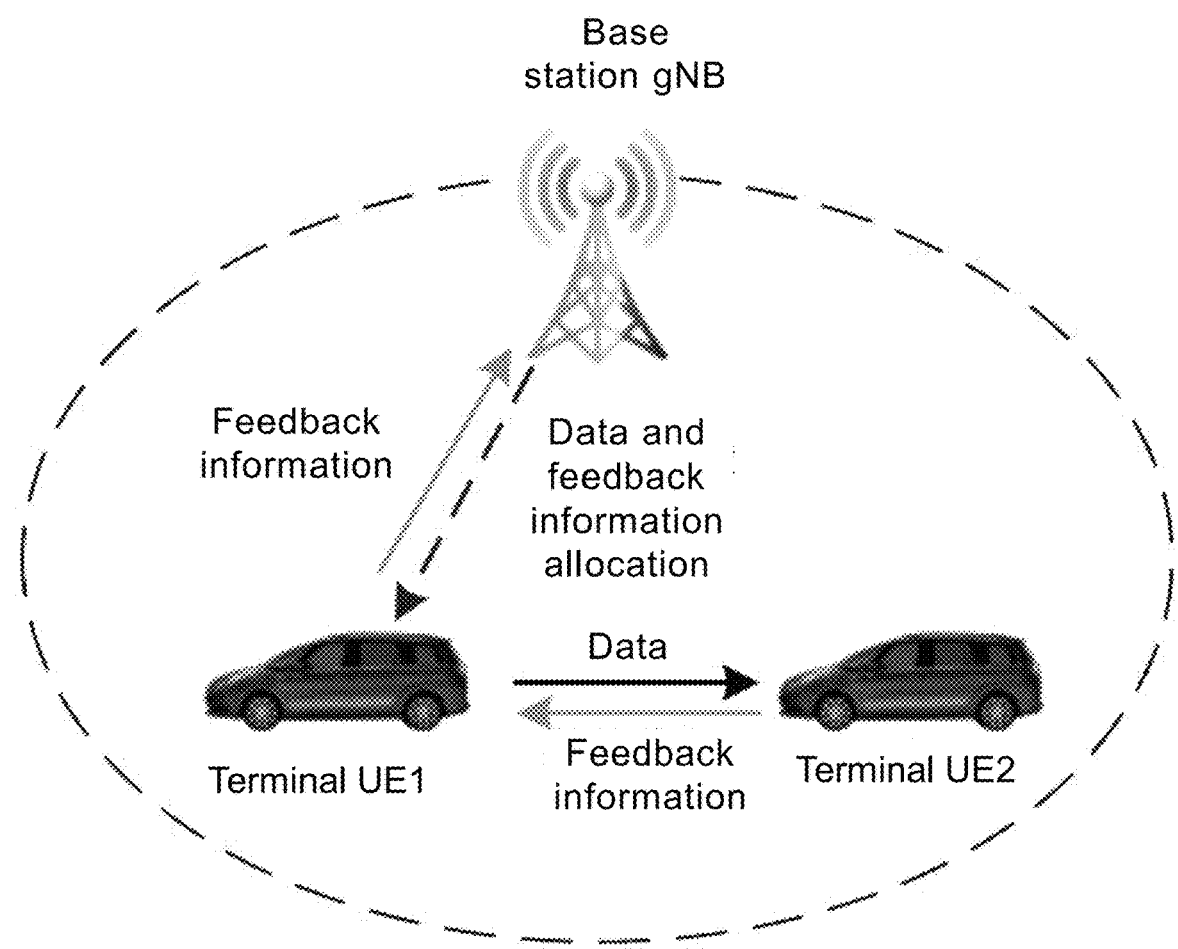
FIG. 2 is a schematic view of a system architecture of a sidelink feedback process.

FIG. 2 shows a schematic view of data transmission between a network device such as a base station gNB and multiple terminals. UE1 is a transmitting terminal TX UE, UE2 is a receiving terminal RX UE, gNB allocates sidelink transmission resources for UE1, and allocates the transmission resource of PUCCH. UE1 sends sidelink data PSCCH and PSSCH to UE2 on the sidelink transmission resources allocated by gNB, and UE2 sends sidelink feedback information (such as sending HARQ-ACK on PSFCH) to UE1 according to the detection result of sidelink data, thereby indicating whether the sidelink data is received correctly. UE1 reports the sidelink feedback information to the network through PUCCH, and the network decides whether to allocate retransmission resources to UE1 according to the sidelink feedback information reported by UE1.

In mode 1, the network allocates sidelink transmission resources to the terminal, and allocates PUCCH resources to the terminal for the terminal to report sidelink feedback information. If the terminal reports ACK on the PUCCH, it means that the sidelink data has been correctly received, and the terminal does not expect the network to schedule retransmission resources. However, in practical applications, the network may have a detection error, in other words, the network may erroneously detect the ACK as NACK, or erroneously detect as the Discontinuous Transmission (DTX) state of the terminal, then the network will allocate retransmission resources to the terminal. Under the circumstances, how the terminal device handles the allocated retransmission resources is a problem to be solved.

Figure 3:
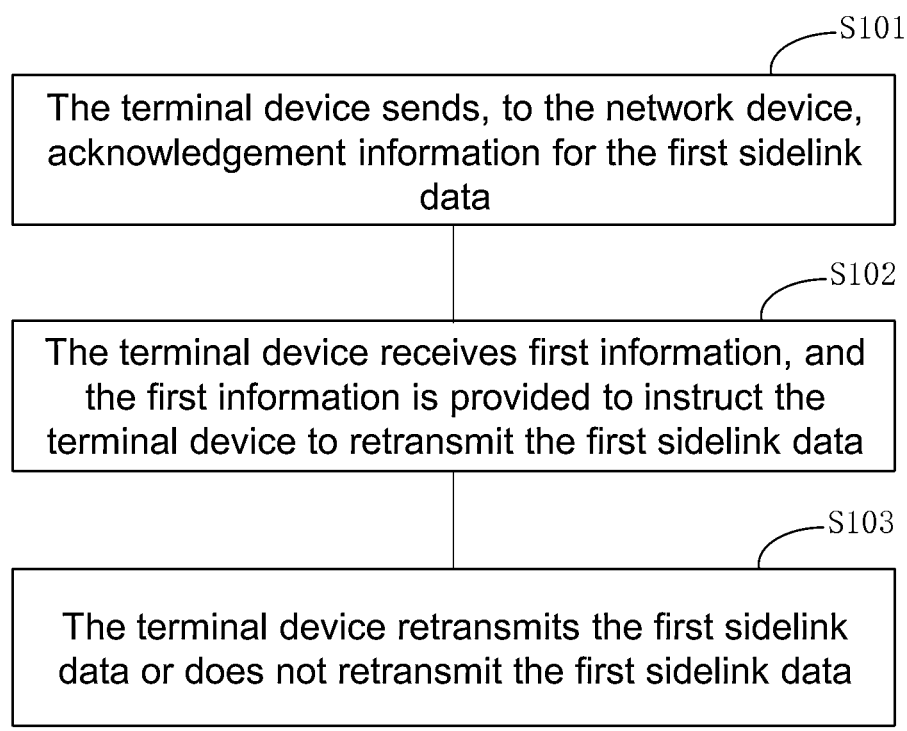
FIG. 3 is a flowchart diagram of a sidelink data transmission method according to an embodiment of the present disclosure.

In view of the above, an embodiment of the present disclosure provides a sidelink data transmission method, which is applied to a terminal device. Referring to FIG. 3, the method includes:

S101. The terminal device sends, to the network device, acknowledgement information for the first sidelink data;

S102. The terminal device receives first information, and the first information is used to instruct the terminal device to retransmit the first sidelink data;

S103. The terminal device retransmits the first sidelink data or does not retransmit the first sidelink data.

Regarding the embodiment of the present disclosure, an application scenario is that the network device allocates the first sidelink transmission resource and the first uplink transmission resource to the terminal device. The terminal device transmits the first sidelink data on the first sidelink transmission resource, and transmits acknowledgement information, such as ACK, on the first uplink transmission resource, and such information is used to notify the network device that the first sidelink data has been correctly received by the receiving terminal. Here, if the network device detects the ACK erroneously, e.g., ACK is detected as NACK or DTX, in order to ensure correct data transmission, the network device will allocate resources for the terminal device to retransmit the first sidelink data. Therefore, after transmitting the acknowledgement, the terminal device will still receive the instruction information sent by the network device to instruct the terminal device to retransmit the first sidelink data. For the above situation, according to the processing strategy of the embodiment of the present disclosure, the terminal device may determine to retransmit the first sidelink data, or may determine not to retransmit the first sidelink data.

Considering from different aspects, on the one hand, if the terminal device retransmits the first sidelink data, that is, the terminal device performs sidelink transmission according to the instructions of the network device, the network device may be able to predict the behavior of the terminal device, and the system data transmission is smooth and orderly, and easy to maintain.

On the other hand, if the terminal device does not retransmit the first sidelink data, that is, the terminal device does not retransmit data on the retransmission resources scheduled by the network device, unnecessary retransmissions may be reduced, and resources conflict on the sidelink may be reduced, which to a certain extent, reduces the congestion of the sidelink and improves the overall performance of the system.

In an embodiment of the present disclosure, the first information may include downlink control information (DCI), and the DCI is used to allocate second sidelink transmission resource and second uplink transmission resource to the terminal device. The second sidelink transmission resource is used for the terminal device to retransmit the first sidelink data, and the second uplink transmission resource is used for the terminal device to transmit the feedback information obtained after the retransmission.

Further, the DCI may carry the first HARQ process ID, the first HARQ process ID corresponds to the first sidelink data, and the NDI carried by the DCI is not toggled, indicating that the second sidelink transmission resource scheduled by the DCI is used for retransmitting the first sidelink data.

The embodiments of the present disclosure may be specifically implemented in various manners, which will be described in detail below, and all the terminal devices refer to the transmitting terminal.

Method 1:

The terminal device determines not to retransmit the first sidelink data, and the terminal device sends acknowledgement information to the network device.

First, since the first sidelink data sent by the terminal has been correctly received, there is no need to retransmit the first sidelink data. Therefore, even if the retransmission instruction and resources are received, the terminal device does not perform retransmission, which may reduce the unnecessary resource conflicts on the sidelink and improve congestion of the sidelink. In addition, the terminal device transmits an ACK for the first sidelink data on the second uplink transmission resource, so as to feed back to the network device that the first sidelink data has been correctly received, so as to prevent the network device from allocating retransmission resources.

Method 2:

The terminal device retransmits the first sidelink data, and the terminal device sends acknowledgement information to the network device.

The difference between Method 2 and Method 1 is that, if the network device schedules retransmission resources for the terminal device, the terminal device retransmits the first sidelink data on the retransmission resources. That is, even if the terminal device has obtained the acknowledgement of receiving terminal, the terminal device still retransmits the first sidelink data on the second sidelink transmission resource according to the instruction of the network device, so that the network device is able to predict the behavior of the terminal device.

Further, in some embodiments, after the terminal device retransmits the first sidelink data, the terminal device receives acknowledgement information for the retransmitted first sidelink data.

In some embodiments, after the terminal device retransmits the first sidelink data, the terminal device receives negative acknowledgement information for the retransmitted first sidelink data.

In some embodiments, the terminal device does not receive acknowledgement information or negative acknowledgement information for the retransmitted first sidelink data.

The situations of the above three embodiments are all applicable to the Method 2 for the reason that the retransmitted first sidelink data has been correctly received by the receiving terminal in the last transmission. Accordingly, no matter whether the feedback information received by the terminal device for retransmitted first sidelink data is ACK or NACK, or either ACK or NACK is not received, the terminal device transmits ACK on the allocated second uplink transmission resource, which does not affect the accuracy of the reported information.

In the case where the terminal device does not receive ACK or NACK, it is possible that a DTX state occurs. Generally, if a DTX condition occurs, at least one of the following conditions might take place:

① The receiving terminal sends sidelink feedback information such as ACK or NACK, but the transmitting terminal does not detect the ACK or NACK, and the information may be determined as DTX;

② The receiving terminal does not send the sidelink feedback information. Specifically, for example, the receiving terminal fails to detect the PSCCH sent by the transmitting terminal, and the receiving terminal cannot know the PSSCH scheduled by the PSCCH. Therefore, the receiving terminal cannot detect the PSSCH, and accordingly, cannot provide feedback for the PSSCH. As a result, the receiving terminal does not send sidelink feedback information.

Therefore, in the DTX state, the terminal device will not receive an ACK, nor will it receive a NACK. In the embodiment of the present disclosure, as described in the foregoing Method 2, since the retransmitted first sidelink data has been correctly received by the receiving terminal in the last transmission, even if the DTX state occurs, the transmitting terminal still reports ACK to the network device, and the accuracy of the reported information is not affected.

On the other hand, when the terminal device retransmits the first sidelink data, the NDI field in the corresponding sidelink control information (SCI) is not toggled, and the SCI carries a second HARQ process ID. There is a first mapping relationship between the second HARQ process ID and the first HARQ process ID in the DCI for allocating retransmission resources. In this way, when the receiving terminal receives the sidelink data, it may be determined that the sidelink data is a retransmission of the previous first sidelink data according to the first mapping relationship.

The first mapping relationship may be determined by the terminal device. In some embodiments, the second HARQ process ID is the same as the first HARQ process ID; in other embodiments, the second HARQ process ID and the first HARQ process ID may also be different, both of which may implement the above process.

For example, the network device allocates the first sidelink transmission resource and the first uplink transmission resource to the terminal device through the first DCI, the DCI carries the first HARQ process ID, and the NDI is toggled. The terminal device transmits the first sidelink data on the first sidelink transmission resource, and carries the second HARQ process ID in the SCI. The NDI field in the SCI is toggled to indicate that the transmission is a new data transmission. The terminal device determines the first mapping relationship between the first HARQ process ID and the second HARQ process ID. If the terminal device receives the ACK sent by the receiving terminal, the acknowledgement information, such as ACK, is transmitted on the first uplink transmission resource to notify the network device that the first sidelink data has been correctly received by the receiving terminal. If the network device detects the ACK erroneously, for example, the ACK is erroneously detected as NACK or DTX, in order to ensure correct transmission of data, the network device will allocate resources for the terminal device to retransmit the first sidelink data. Therefore, the network device will send the second DCI to the terminal device, allocate the second sidelink transmission resource and the second uplink transmission resource to the terminal device, and carry the first HARQ process ID in the second DCI, and the NDI will not be toggled. The terminal device may determine, according to the first HARQ process ID and NDI carried in the DCI, that the DCI is used to allocate sidelink transmission resources for retransmission of the first sidelink transmission. Therefore, the terminal device retransmits the first sidelink data on the second sidelink transmission resource, and carries the second HARQ process ID in the SCI, and the NDI field in the SCI is not toggled to indicate that the transmission is a data retransmission. If the terminal device receives the ACK (or NACK) sent by the receiving terminal, the terminal device transmits an acknowledgement, such as ACK, on the second uplink transmission resource.

Method 3:

The terminal device does not retransmit the first sidelink data, and the terminal device sends the second sidelink data to a target device. The target device is a receiving terminal, such as the vehicle-mounted terminal shown in FIG. 1 or FIG. 2.

Further, if the second sidelink data is correctly received by the target device, the terminal device sends acknowledgement information for the second sidelink data to the network device; if the second sidelink data is not correctly received by the target device, the terminal device sends negative acknowledgement information for the second sidelink data to the network device.

That is to say, the terminal device transmits the second sidelink data on the second sidelink transmission resource allocated by the network device and used for retransmitting the first sidelink data, and determines whether to transmit ACK or NACK on the second uplink transmission resource according to whether the second sidelink data is correctly received by the receiving terminal.

Based on the above processing method, the terminal device sends new sidelink data on the retransmission resources scheduled by the network device. In this way, it is possible to make full use of the resources allocated by the network device for sidelink transmission, improve system throughput, and improve utilization of the system resource.

Further, the NDI carried by the terminal device in the SCI corresponding to the second sidelink data is toggled, indicating that the current sidelink data is newly transmitted data; and the HARQ process ID carried by the terminal device in the SCI may be the second HARQ process ID determined based on the aforementioned first mapping relationship. Alternatively, a third HARQ process ID may also be adopted, which will be described separately below.

a) The SCI corresponding to the second sidelink data carries the second HARQ process ID:

The terminal device uses the second HARQ process ID corresponding to the first HARQ process ID when transmitting the first sidelink data, and also uses the second HARQ process ID when transmitting new second sidelink data. Since the NDI field in the SCI is toggled, it may be indicated that new sidelink data is transmitted, that is, the second sidelink data is different from the first sidelink data. In addition, the terminal device may maintain the first mapping relationship between the first HARQ process ID and the second HARQ process ID.

b) The SCI corresponding to the second sidelink data carries the third HARQ process ID:

The terminal device uses the second HARQ process ID corresponding to the first HARQ process ID when transmitting the first sidelink data, and uses the third HARQ process ID when transmitting the new second sidelink data, and the NDI field in the SCI is toggled, so when the receiving terminal receives the SCI, it may be determined that new sidelink data is transmitted, and the sidelink data corresponds to the third HARQ process ID.

The third HARQ process ID and the first HARQ process ID may have a second mapping relationship, and the second mapping relationship may be determined by the terminal device. The third HARQ process ID and the first HARQ process ID may be the same or different, and they both may implement the above processing process.

Further, the terminal device may update the internally maintained first mapping relationship, and update the mapping relationship between the first HARQ process ID in the original DCI and the second HARQ process ID in the SCI to the mapping relationship between the first HARQ process ID in the DCI and the third HARQ process ID in the SCI.

Figure 4:
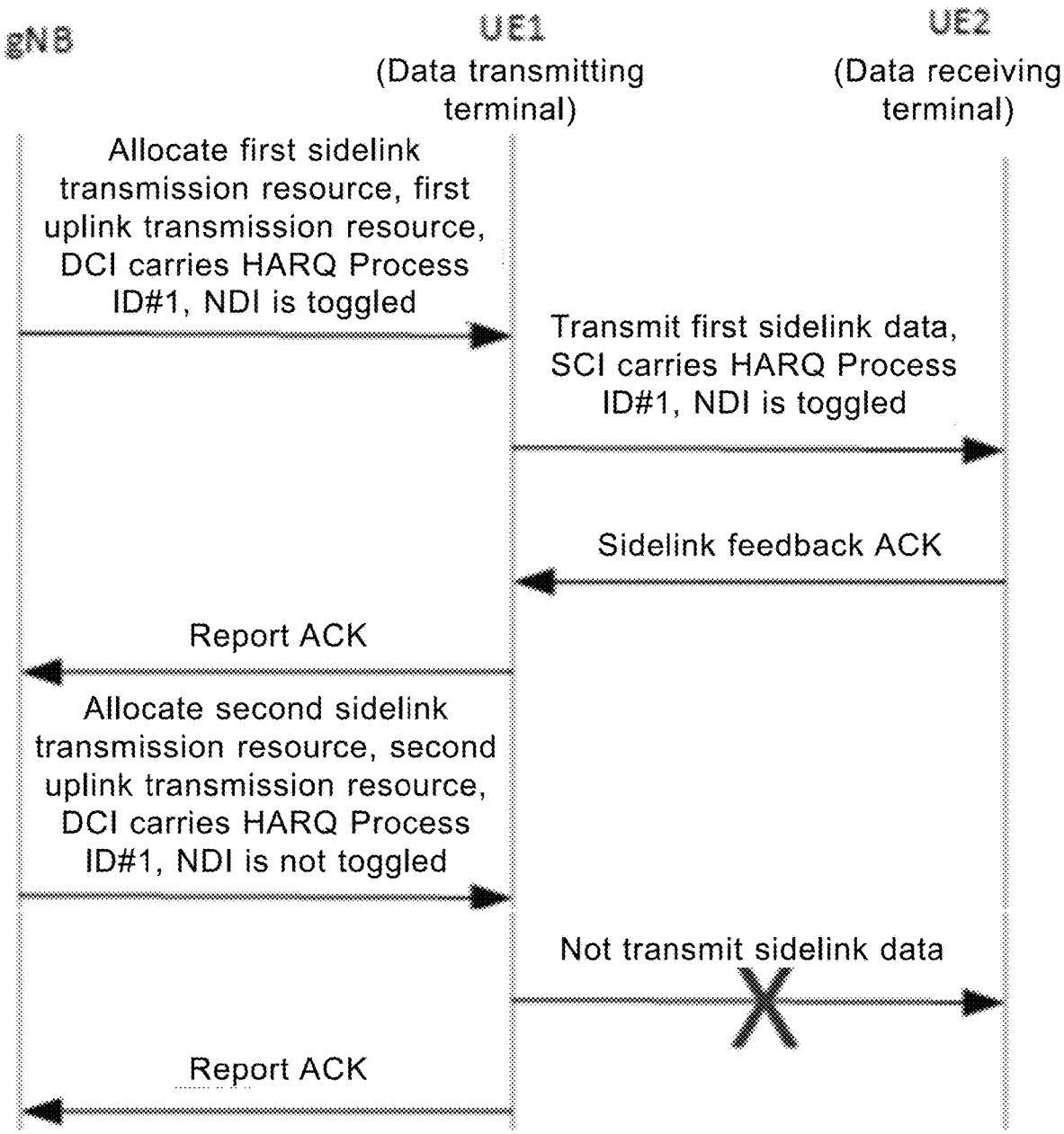
FIG. 4 to FIG. 6 are schematic views of three types of sidelink data transmission processes according to embodiments of the present disclosure, respectively.
Figure 5:
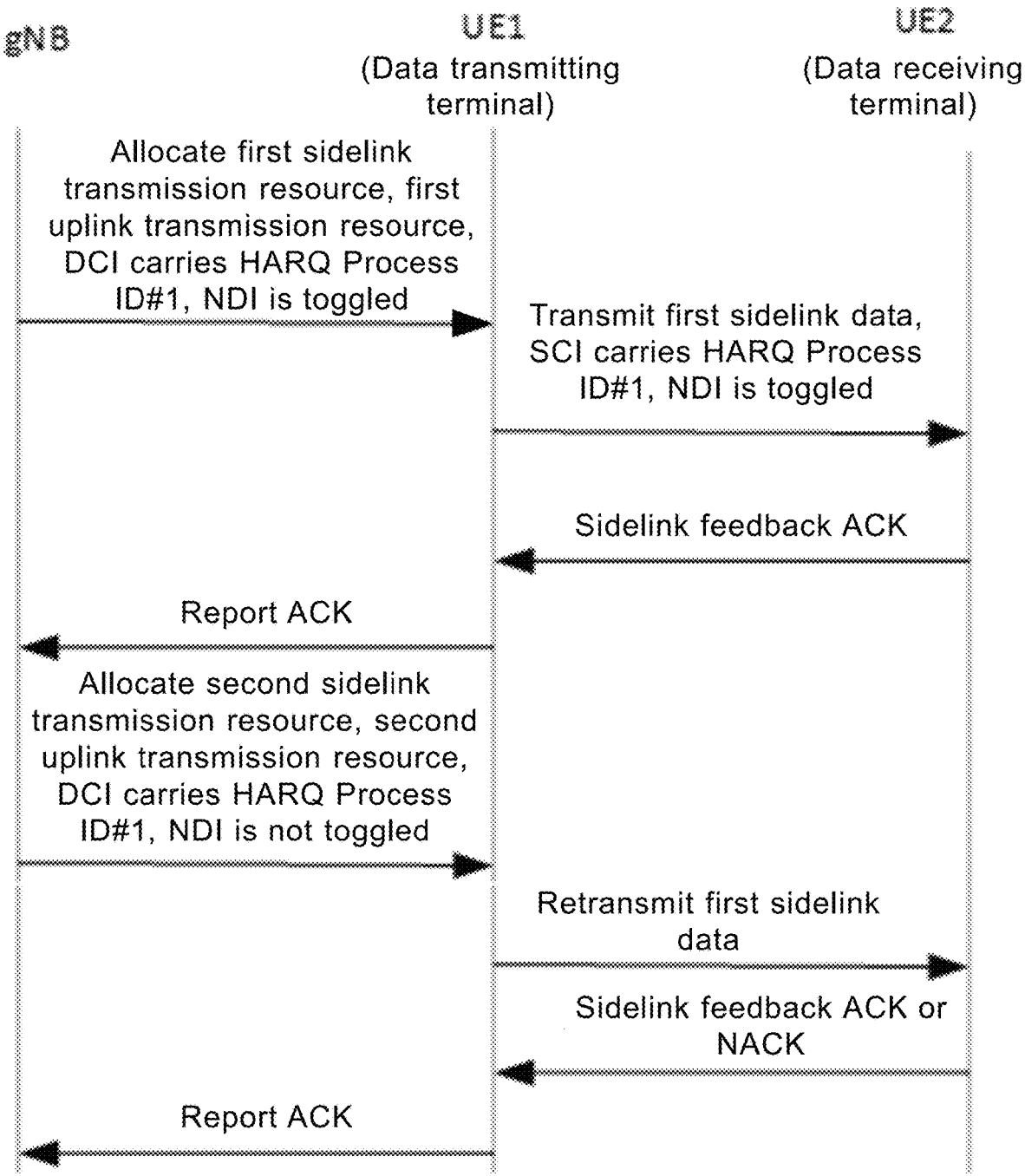
Figure 6:
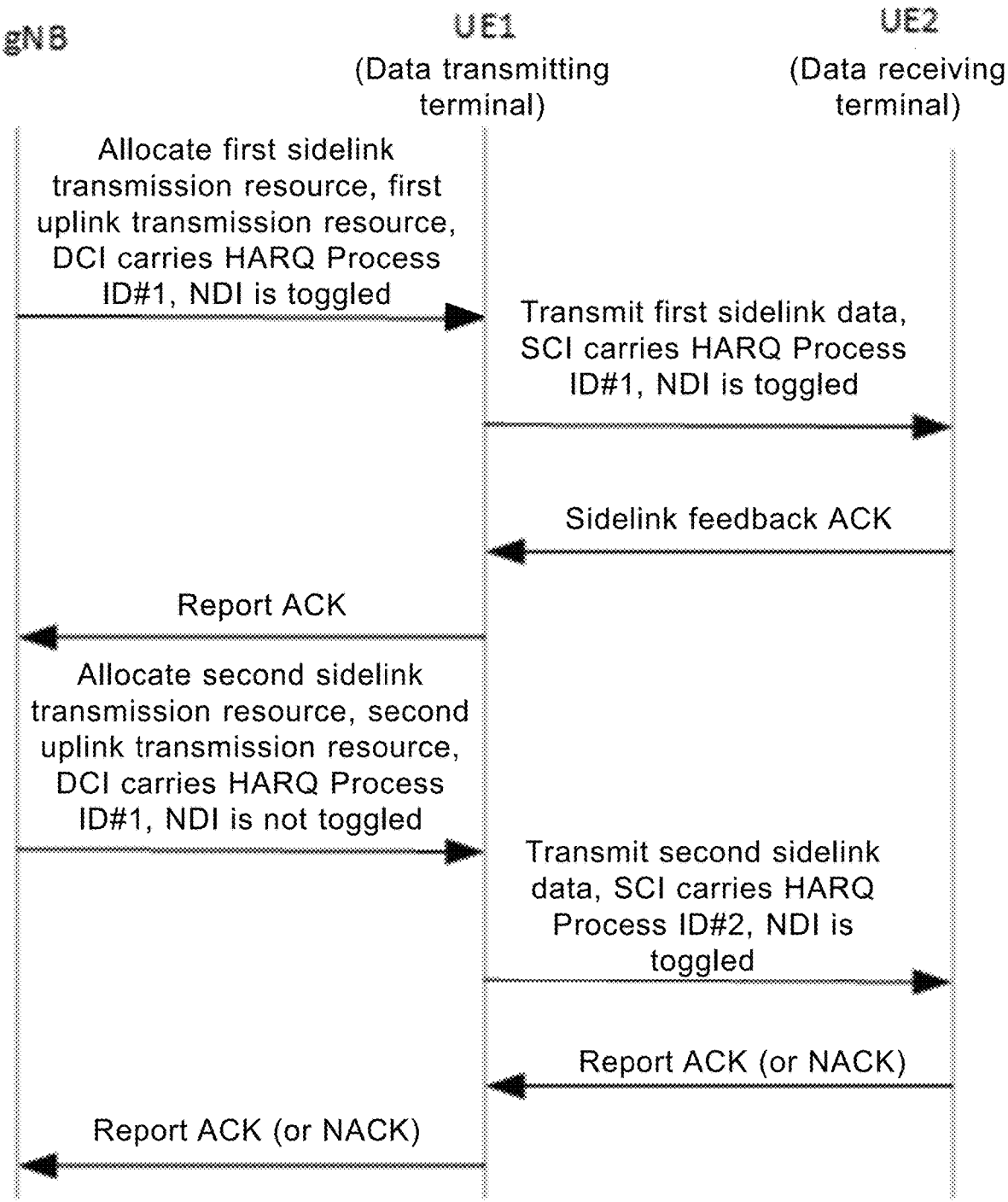

Correspondingly, FIG. 4, FIG. 5, and FIG. 6 respectively show schematic views of system data interaction in the above-described methods 1, 2, and 3. In FIG. 4 to FIG. 6, the data transmission processes in the early stage are similar. The network device (gNB) allocates the first sidelink transmission resource and the first uplink transmission resource to UE1 through dynamic scheduling or configure grant, and the first sidelink transmission resource corresponds to HARQ process ID#1. UE1 transmits the first sidelink data on the first sidelink transmission resource, and HARQ process ID#1 is indicated in the SCI, and the NDI is toggled. Here, optionally, HARQ process ID#2 may also be indicated in the SCI, and UE1 determines the first mapping relationship between HARQ process ID#1 and HARQ process ID#2. Then, when the gNB schedules retransmission resources and indicates HARQ process ID#1, UE1 may determine that the transmission is a retransmission of the sidelink data for HARQ process ID#2. UE1 receives the ACK sent by UE2, and transmits the ACK to the network on the first uplink transmission resource. However, UE1 receives the DCI signaling sent by the network, indicating the second sidelink transmission resource and the second uplink transmission resource. The DCI carries HARQ process ID#1, and the NDI is not toggled. UE1 determines that the transmission is the retransmission scheduling for the first sidelink data. Thereafter, UE1 may use the processes shown in FIG. 4, FIG. 5, and FIG. 6 (respectively corresponding to Method 1, Method 2, and Method 3) to complete data retransmission, non-retransmission, or new data transmission.

Based on the embodiments of the present disclosure described above, when a terminal device reports an ACK to a network device and receives retransmission scheduling, the terminal device may choose not to perform sidelink retransmission, but still report ACK; the terminal device may choose to perform sidelink retransmission, and report ACK; the terminal device may also choose to transmit new data, and report ACK or NACK to the network device according to whether the new data is correctly received. The embodiments of the present disclosure may achieve rational utilization of system resources to different degrees.

In practical applications, another situation is that the terminal device reports a NACK to the network device, and the terminal device expects the network device to schedule retransmission resources, but because the network device erroneously detects the NACK as an ACK, the network device will not schedule retransmission resources for the terminal device.

Figure 7:
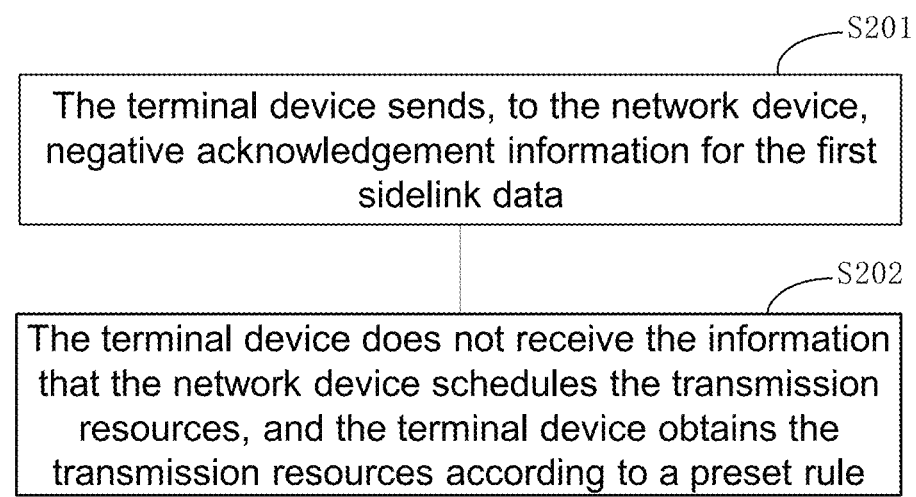
FIG. 7 is a flowchart diagram of a sidelink data transmission method according to another embodiment of the present disclosure.

In view of the above situation, an embodiment of the present disclosure further provides a sidelink data transmission method, which is applied to a terminal device. Referring to FIG. 7, the method includes:

S201. The terminal device sends, to the network device, negative acknowledgement information for the first sidelink data;

S202. The terminal device does not receive the information that the network device schedules the transmission resources, and the terminal device obtains the transmission resources according to a preset rule.

Regarding the terminal device acquiring transmission resources according to the preset rules, the embodiments of the present disclosure may be implemented in various ways, which will be described in detail below.

Method 1:

In the case of not receiving the information that the network device schedules the transmission resource, the terminal device selects the transmission resource in the resource pool for retransmitting the first sidelink data.

Specifically, if the terminal device does not receive the DCI information that the network device schedules the retransmission resource within a time T after the NACK is transmitted, the terminal device may autonomously select the transmission resource in the resource pool, and retransmit the first sidelink data on the selected transmission resource.

Optionally, the terminal device converts from the predefined first transmission mode to the predefined second transmission mode, for example, from the aforementioned mode 1 to mode 2. The resource pool may be an exception resource pool, and the terminal device may obtain required transmission resources from the exception resource pool.

The terminal device adopting this embodiment may acquire resources autonomously, and may transmit the sidelink data that needs to be retransmitted for the receiving terminal to receive.

Method 2:

In the case of not receiving the information that the network device schedules transmission resources, the terminal device sends resource request information to the network device, and the resource request information is used by the network device to schedule transmission resources for the terminal device.

Specifically, if the terminal device does not receive the DCI information that the network device schedules retransmission resources within a time T after the NACK is transmitted, the terminal device is triggered to report resource request information to the network device, and the terminal device requests the network device to schedule transmission resources.

Optionally, assuming that the time when the terminal device sends the NACK to the network device is in the first time unit, if the information that the network device schedules transmission resources is not received within the duration T after the first time unit, the terminal device may send resource request information to the network device.

Optionally, the duration T is determined according to network configuration information or pre-configuration information.

Optionally, the duration T may be represented by the number of time slots, and the number of time slots may be determined by a subcarrier spacing (SCS) of the sidelink.

Taking the time unit as a time slot as an example, the terminal device transmits a NACK to the network device in the time slot n, and does not detect the DCI for retransmission scheduling within n+K time slots, then the terminal device reports the scheduling request (SR) to the network device, requesting the network to schedule transmission resources. K represents the number of time slots, the time of K time slots corresponds to the time length T, and the value of K may be determined by the SCS of the sidelink.

The terminal device using this embodiment may request resource scheduling from the network device, and may transmit the sidelink data that needs to be retransmitted for the receiving terminal to receive.

Method 3:

In the case of not receiving the information that the network device schedules the transmission resources, the terminal device may send the negative acknowledgement information for the first sidelink data to an upper layer, so as to trigger the automatic retransmission request (ARQ) process of the upper layer.

Specifically, if the terminal device does not receive the DCI information that the network device schedules the retransmission resources within the time period T after the NACK is transmitted, the terminal device reports the indication information to the upper layer, thereby triggering the ARQ process of the upper layer.

Optionally, the indication information is NACK.

Here, it may be understood that the transmission of data includes a HARQ process (e.g., a HARQ process at a physical layer) and an ARQ process (e.g., an ARQ process at an upper layer). In this embodiment, when the HARQ process cannot ensure that the data is correctly received, the terminal device reports NACK to the upper layer to trigger the upper layer to start the ARQ process, thereby ensuring that the data retransmission may be completed and received by the receiving terminal.

Figure 8:
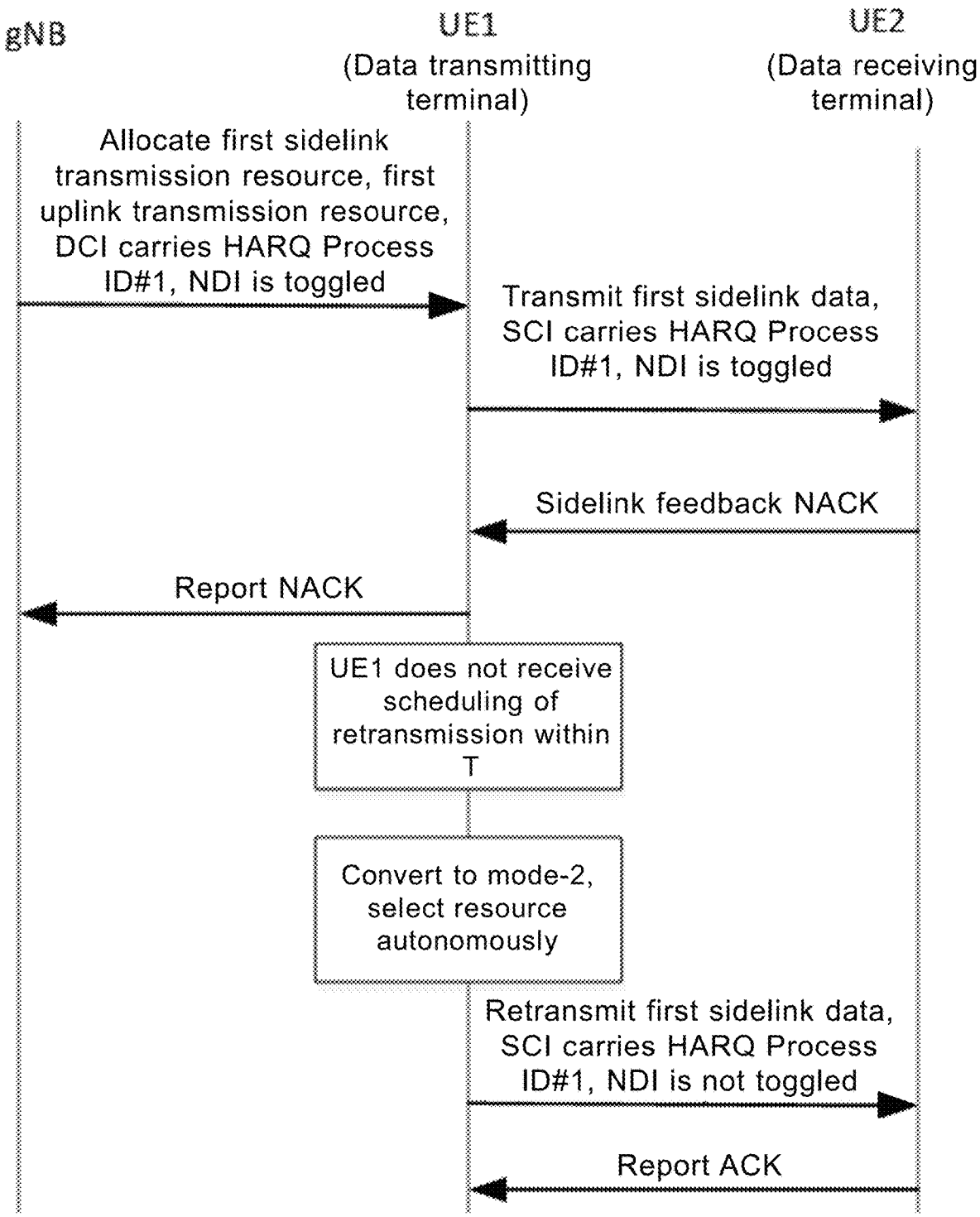
FIG. 8 to FIG. 10 are schematic views of three types of sidelink data transmission processes according to embodiments of the present disclosure, respectively.
Figure 9:
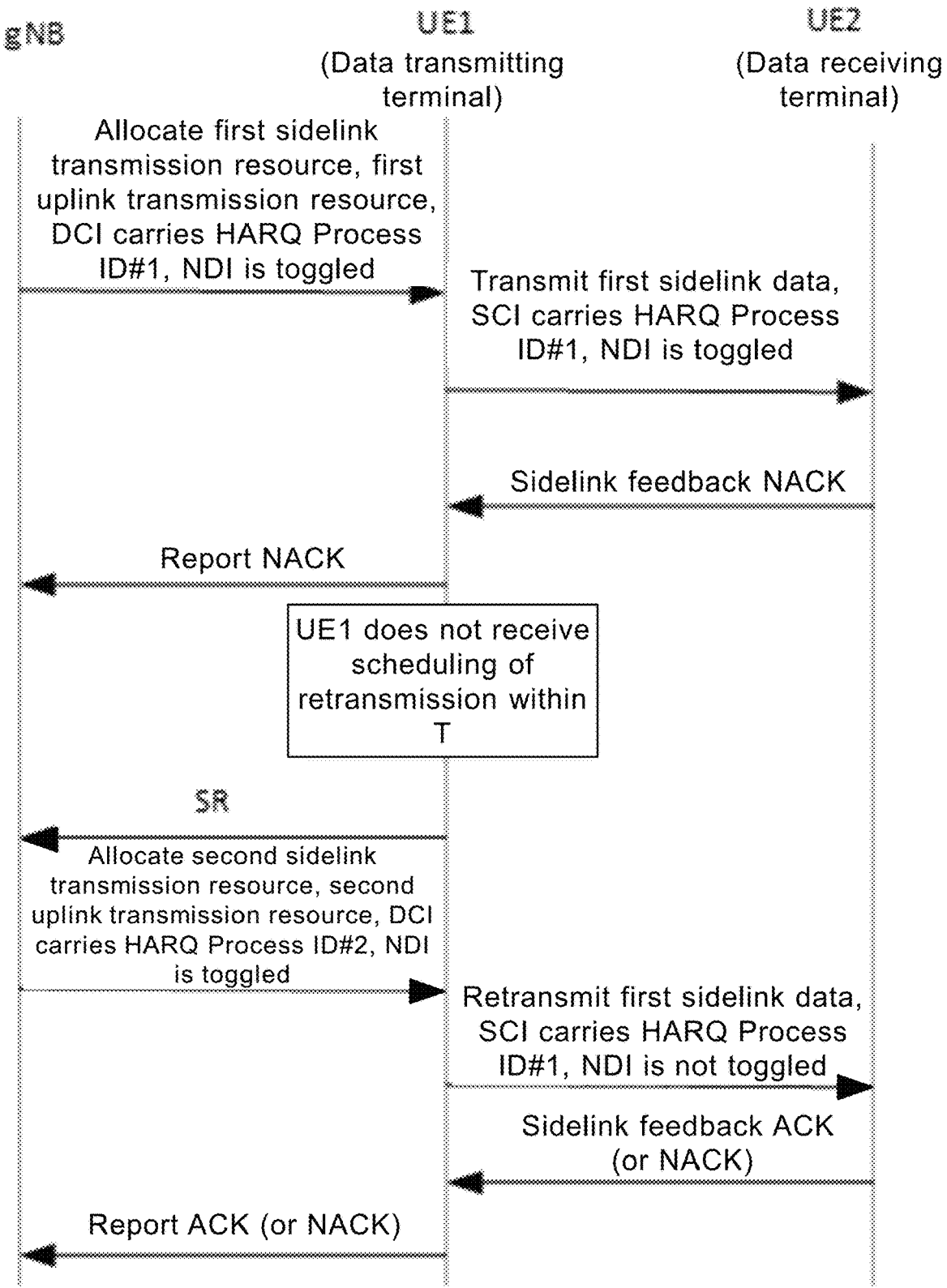
Figure 10:
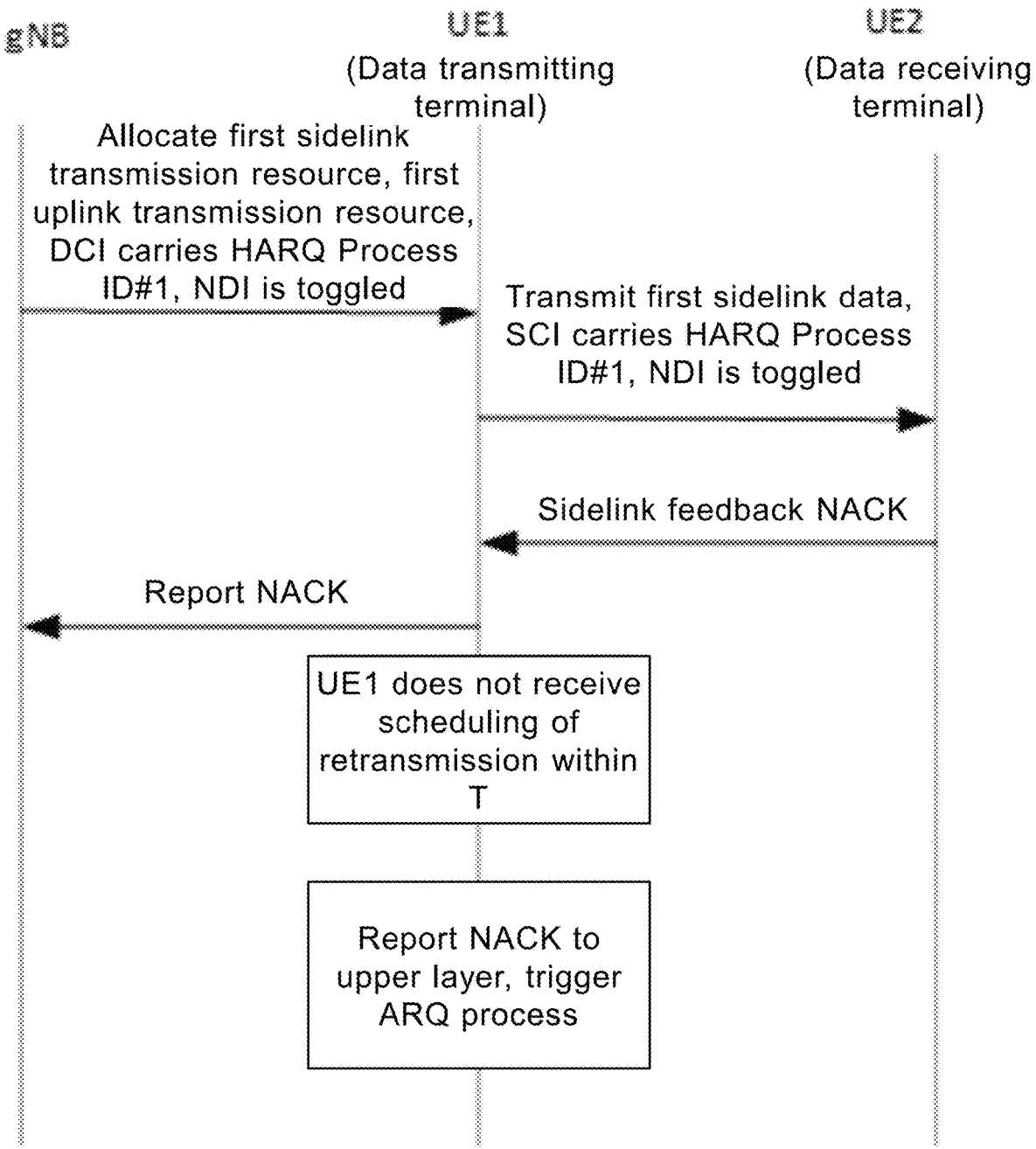

Correspondingly, FIG. 8, FIG. 9, and FIG. 10 respectively show schematic views of system data interaction in the Methods 1, 2, and 3 described above. In FIG. 8 to FIG. 10, the data transmission processes in the early stage are similar. The network device (gNB) allocates the first sidelink transmission resource and the first uplink transmission resource to UE1 through dynamic scheduling or configure grant, and the first sidelink transmission resource corresponds to HARQ process ID#1. UE1 transmits the first sidelink data on the first sidelink transmission resource, and HARQ process ID#1 is indicated in the SCI, and the NDI is toggled. Here, optionally, HARQ process ID#2 may also be indicated in the SCI, and UE1 determines the first mapping relationship between HARQ process ID#1 and HARQ process ID#2, then when the gNB schedules retransmission resources and indicates HARQ process ID#1, UE1 may determine that the transmission is the retransmission of the sidelink data for HARQ process ID#2.

Different from FIG. 4 to FIG. 6, UE1 receives the NACK sent by UE2 and transmits the NACK to the network on the first uplink transmission resource. However, UE1 does not receive the retransmission scheduling within the duration T. Thereafter, UE1 may use the processes shown in FIG. 8, FIG. 9, and FIG. 10 (respectively corresponding to Method 1, Method 2, and Method 3) to complete autonomous resource selection (converted from mode-1 to mode-2), request network resources or report NACK to the upper layer to ensure the correct transmission of data.

Figure 11:
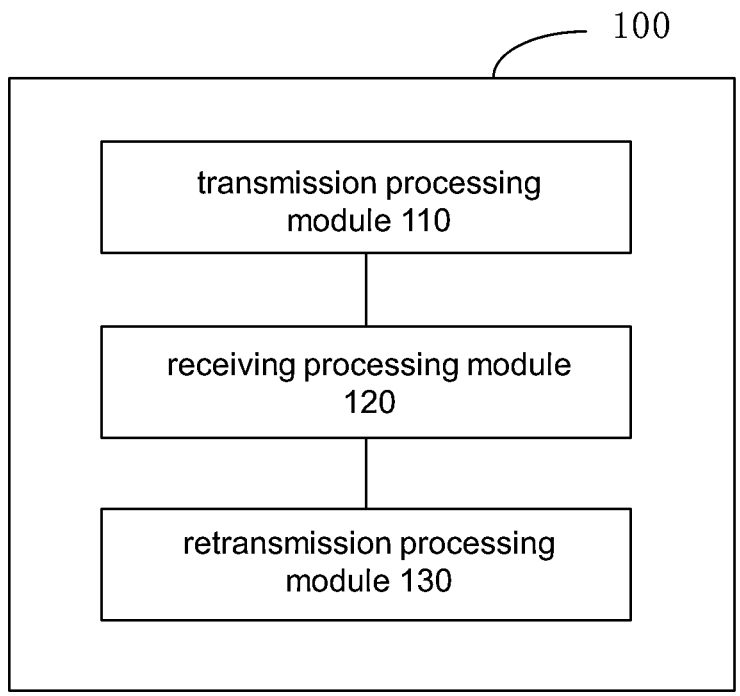
FIG. 11 and FIG. 12 are schematic structural block views of terminal devices according to embodiments of the present disclosure, respectively.

The specific settings and implementations of the embodiments of the present disclosure have been described above through multiple embodiments from different perspectives. Corresponding to the processing method of at least one of the foregoing embodiments, an embodiment of the present disclosure further provides a terminal device 100, referring to FIG. 11, which includes:

A transmission processing module 110 is configured to send acknowledgement information for the first sidelink data to the network device;

A receiving processing module 120 is configured to receive first information, and the first information is configured to instruct the terminal device to retransmit the first sidelink data;

A retransmission processing module 130 is configured to retransmit the first sidelink data or not to retransmit the first sidelink data.

In an embodiment of the present disclosure, optionally, the first information includes downlink control information (DCI), and the DCI carries a first HARQ process ID of a HARQ, and the first HARQ process ID corresponds to the first sidelink data. The new data indicator (NDI) carried by the DCI is not toggled.

In an embodiment of the present disclosure, optionally, the terminal device 100 further includes: a first transmitting module, configured to send acknowledgement information to the network device when the retransmission processing module 130 does not retransmit the first sidelink data.

In an embodiment of the present disclosure, optionally, the terminal device 100 further includes: a second transmitting module, configured to send acknowledgement information to the network device when the retransmission processing module 130 retransmits the first sidelink data.

In an embodiment of the present disclosure, optionally, the terminal device 100 further includes: a first receiving module, configured to receive acknowledgement information for the retransmitted first sidelink data after the retransmission processing module 130 retransmits the first sidelink data.

In an embodiment of the present disclosure, optionally, the terminal device 100 further includes: a second receiving module, configured to receive negative acknowledgement information for the retransmitted first sidelink data after the retransmission processing module 130 retransmits the first sidelink data.

In an embodiment of the present disclosure, optionally, the terminal device 100 further includes: a third receiving module, configured to receive acknowledgement information or negative acknowledgement information for the retransmitted first sidelink data after the retransmission processing module 130 retransmits the first sidelink data.

In an embodiment of the present disclosure, optionally, the terminal device 100 further includes: a third transmitting module, configured to send the second sidelink data to the target device when the retransmission processing module 130 does not retransmit the first sidelink data.

In an embodiment of the present disclosure, optionally, the terminal device 100 further includes: a fourth transmitting module, configured to send acknowledgement information for the second sidelink data to the network device when the second sidelink data is correctly received by the target device; the fourth transmitting module is further configured to send negative acknowledgement information for the second sidelink data to the network device when the second sidelink data is not correctly received by the target device.

In an embodiment of the present disclosure, optionally, the sidelink control information (SCI) corresponding to the second sidelink data carries a second HARQ process ID, and the NDI carried in the SCI is toggled; there is a first mapping relationship between the second HARQ process ID and the first HARQ process ID.

In an embodiment of the present disclosure, optionally, the second HARQ process ID is the same as the first HARQ process ID.

In an embodiment of the present disclosure, optionally, the SCI corresponding to the second sidelink data carries a third HARQ process ID, and the NDI carried in the SCI is toggled; there is a second mapping relationship between the third HARQ process ID and the first HARQ process ID.

In an embodiment of the present disclosure, optionally, the third HARQ process ID is the same as the first HARQ process ID.

The terminal device 100 in this embodiment of the present disclosure may implement the corresponding functions described in the foregoing method embodiments. For the functions, implementation methods, and advantageous effects corresponding to each module and sub-module in the terminal device 100, reference may be made to the corresponding descriptions in the foregoing method embodiments, and details will not be repeated here.

Figure 12:
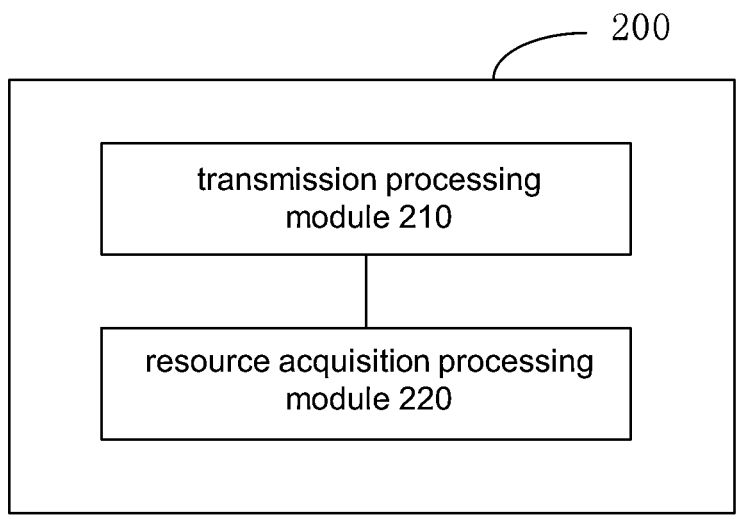

Corresponding to the processing method of at least one of the foregoing embodiments, an embodiment of the present disclosure further provides a terminal device 200, referring to FIG. 12, which includes:

A transmission processing module 210 is configured to send the negative acknowledgement information for the first sidelink data to the network device;

A resource acquisition processing module 220 is configured to acquire transmission resources according to a preset rule when the information that the network device schedules transmission resources is not received.

In an embodiment of the present disclosure, optionally, the resource acquisition processing module 220 includes: a first resource acquisition sub-module, configured to select a transmission resource from a resource pool, and the transmission resource is used to retransmit the first sidelink data.

In an embodiment of the present disclosure, optionally, the terminal device 200 further includes: a mode conversion module, configured to convert the transmission mode of the terminal device 200 from a predefined first transmission mode to a predefined second transmission mode.

In an embodiment of the present disclosure, optionally, the resource acquisition processing module 220 includes: a second resource acquisition sub-module, configured to send resource request information to the network device, and the resource request information is used for the network device to schedule the transmission resources for the terminal device 200.

In an embodiment of the present disclosure, optionally, the time when the transmission processing module sends the negative acknowledgement information to the network device is in a first time unit; the second resource acquisition sub-module is configured to send the resource request information to the network device in the case where the information that the network device schedules transmission resources is not received within the duration T after the first time unit.

In an embodiment of the present disclosure, optionally, the duration T is determined according to network configuration information or pre-configuration information.

In an embodiment of the present disclosure, optionally, the duration T is represented by the number of time slots, and the number of time slots is determined by the subcarrier spacing (SCS) of the sidelink.

In an embodiment of the present disclosure, optionally, the resource acquisition processing module 220 includes: a third resource acquisition sub-module, configured to send negative acknowledgement information for the first sidelink data to an upper layer, so as to trigger an automatic retransmission request (ARQ) process of the upper layer.

The terminal device 200 in this embodiment of the present disclosure may implement the corresponding functions described in the foregoing method embodiments. For the functions, implementation methods, and advantageous effects corresponding to each module and sub-module in the terminal device 200, reference may be made to the corresponding descriptions in the foregoing method embodiments, and details will not be repeated here.

It should be noted that the functions of the respective modules (or sub-modules) in the terminal device 100 and the terminal device 200 of the embodiments of the present disclosure may be implemented by different modules (or sub-modules), or may be implemented by the same module (or sub-module). For example, the first transmitting module and the second transmitting module may be different modules, or may be the same module, both of which may implement the corresponding functions of the terminal device in the embodiments of the present disclosure.

Figure 13:
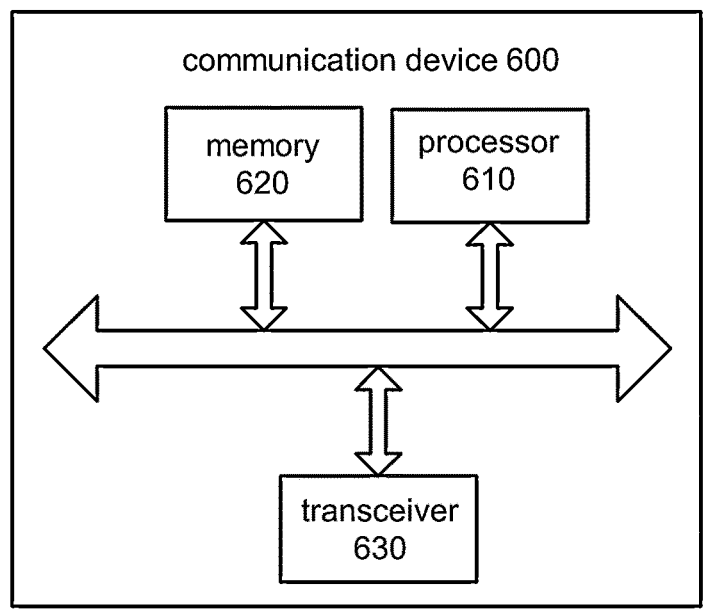
FIG. 13 is a schematic block view of a communication device according to an embodiment of the present disclosure.

FIG. 13 is a schematic structural view of a communication device 600 according to an embodiment of the present disclosure. The communication device 600 includes a processor 610, and the processor 610 may invoke and execute a computer program from a memory to implement the method in the embodiments of the present disclosure.

Optionally, the communication device 600 may further include a memory 620. The processor 610 may invoke and execute a computer program from the memory 620 to implement the method in the embodiments of the present disclosure.

The memory 620 may be a separate device independent of the processor 610, or may be integrated in the processor 610.

Optionally, the communication device 600 may further include a transceiver 630, and the processor 610 may control the transceiver 630 to communicate with other devices. Specifically, the communication device 600 may send information or data to other devices, or receive information or data sent by other devices.

The transceiver 630 may include a transmitter and a receiver. The transceiver 630 may further include antennas, and the number of the antennas may be one or more.

Optionally, the communication device 600 may be the network device in the embodiment of the present disclosure, and the communication device 600 may implement the corresponding processes implemented by the network device in various methods in the embodiments of the present disclosure, and details are not repeated here for brevity.

Optionally, the communication device 600 may be a terminal device in this embodiment of the present disclosure, and the communication device 600 may implement corresponding processes implemented by the terminal device in various methods in the embodiments of the present disclosure, and details are not repeated here for brevity.

Figure 14:
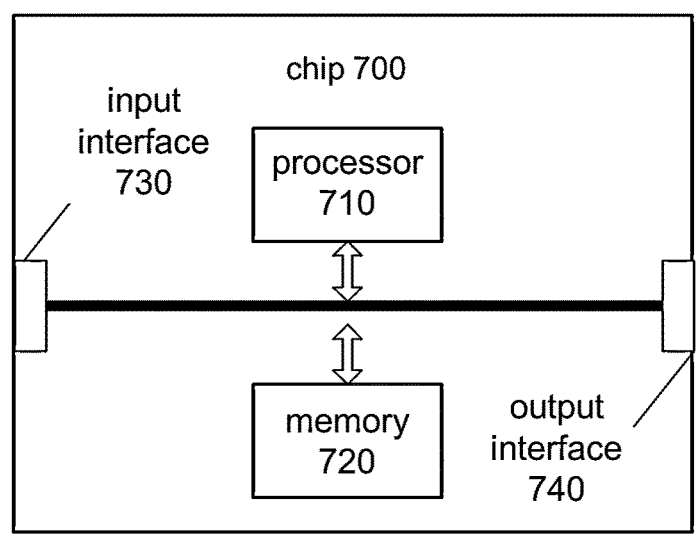
FIG. 14 is a schematic block view of a chip according to an embodiment of the present disclosure.

FIG. 14 is a schematic structural view of a chip 700 according to an embodiment of the present disclosure. The chip 700 includes a processor 710, and the processor 710 may invoke and execute a computer program from a memory to implement the method in the embodiments of the present disclosure.

Optionally, the chip 700 may further include a memory 720. The processor 710 may invoke and execute a computer program from the memory 720 to implement the method in the embodiments of the present disclosure.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the network device in the embodiments of the present disclosure, and the chip may implement the corresponding processes implemented by the network device in various methods of the embodiments of the present disclosure, and details are not repeated here for brevity.

Optionally, the chip may be applied to the terminal device in the embodiments of the present disclosure, and the chip may implement the corresponding processes implemented by the terminal device in various methods of the embodiments of the present disclosure, and details are not repeated here for brevity.

It should be understood that the chip mentioned in the embodiments of the present disclosure may also be referred to as a system-on-a-chip, a system-on-chip, a system on chip, an SoC, or the like.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor or the like.

The memory mentioned above may be either volatile memory or non-volatile memory, or may include both volatile and non-volatile memory. The non-volatile memory may be read-only memory (ROM), programmable ROM (PROM), erasable PROM (EPROM), electrically EPROM (EEPROM), or flash memory. Volatile memory may be random access memory (RAM).

It should be understood that the above-mentioned memory is an exemplary but non-limiting description. For example, the memory in the embodiment of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), and so on. That is, the memory in the embodiments of the present disclosure is intended to include but not limited to these and any other suitable types of memory.

Figure 15:
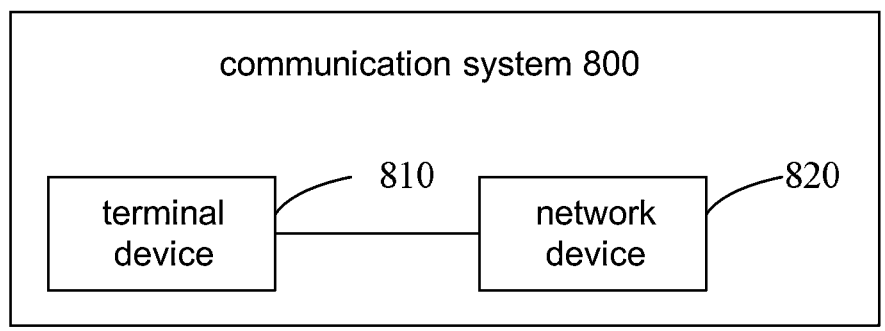
FIG. 15 is a schematic block view of a communication system according to an embodiment of the present disclosure.

FIG. 15 is a schematic block view of a communication system 800 according to an embodiment of the present disclosure, and the communication system 800 includes a terminal device 810 and a network device 820.

The terminal device 810 may be configured to implement the corresponding functions implemented by the terminal device in the methods of the various embodiments of the present disclosure, and the network device 820 may be configured to implement the corresponding functions implemented by the network device in the methods of the various embodiments of the present disclosure. For brevity, details are not repeated here.

The above-mentioned embodiments may be implemented in whole or in part by software, hardware, firmware or any combination thereof. When implemented in software, the embodiments can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general-purpose computer, a special-purpose computer, a computer network, or other programmable device. The computer instructions may be stored in a computer readable storage medium, or transmitted from one computer readable storage medium to another computer readable storage medium. For example, the computer instructions may be transmitted from a website site, a computer, a server or a data center (e.g., coaxial cable, optical fiber, Digital Subscriber Line (DSL)) in a wired or wireless manner (e.g., infrared, wireless, microwave, etc.) to another website site, computer, server or data center. The computer-readable storage medium may be any available medium that can be accessed by a computer or a data storage device such as a server, a data center, etc. that includes one or more integrated available media. The available media may be magnetic media (e.g., floppy disks, hard disks, magnetic tapes), optical media (e.g., DVD), or semiconductor media (e.g., Solid State Disk (SSD)), and so on.

It should be understood that, in various embodiments of the present disclosure, the numbers denoting the above-mentioned processes do not mean the sequence of execution, and the execution sequence of each process should be determined by its functions and internal logic, and should not be construed as limitation to the implementation of the embodiments of the present disclosure.

Those skilled in the art can clearly understand that, for the convenience and brevity of description, the specific operation process of the above-described systems, devices and units can refer to the corresponding processes in the foregoing method embodiments, and details will not be repeated here.

The above are only specific embodiments of the present disclosure, but the protection scope of the present disclosure is not limited thereto. Any person skilled in the art who is familiar with the technical scope disclosed in the present disclosure can easily think of changes or substitutions, and the changes or substitutions should all be covered within the scope of protection of this disclosure. Therefore, the protection scope of the present disclosure shall be subject to the protection scope of the claims.

What is claimed is:

1. A sidelink data transmission method, which is applied to a terminal device, the method comprising:
   the terminal device sending first sidelink data to another terminal device;
   the terminal device receiving acknowledgement information for the first sidelink data from the another terminal device, wherein the acknowledgement information is used to notify that the first sidelink data has been correctly received;
   the terminal device sending, to a network device, the acknowledgement information for first sidelink data; and
   the terminal device receiving first information from the network device, wherein the first information is used for instructing the terminal device to retransmit the first sidelink data;
   wherein the terminal device does not retransmit the first sidelink data when the first information is received,
   wherein the method further comprises:
      the terminal device sending the acknowledgement information to the network device; or
      the terminal device sending second sidelink data to the another terminal device, wherein the second sidelink data is different from the first sidelink data;
   wherein the first information comprises downlink control information (DCI), wherein the DCI carries a first HARQ process ID, the first HARQ process ID corresponds to the first sidelink data, and a new data indicator (NDI) carried by the DCI is not toggled;
   wherein the terminal device carries a second HARQ process ID in sidelink control information (SCI) corresponding to the second sidelink data, and a NDI carried in the SCI is toggled;
   wherein there is a first mapping relationship between the second HARQ process ID and the first HARQ process ID, and the second HARQ process ID is different from the first HARQ process ID.

2. The method according to claim 1, the method further comprising:
   if the second sidelink data is correctly received by the another terminal device, the terminal device sends acknowledgement information for the second sidelink data to the network device;
   if the second sidelink data is not correctly received by the another terminal device, the terminal device sends negative acknowledgement information for the second sidelink data to the network device.

3. A sidelink data transmission method, which is applied to a terminal device, the method comprising:
   the terminal device sending first sidelink data to another terminal device;
   the terminal device receiving acknowledgement information for the first sidelink data from the another terminal device, wherein the acknowledgement information is used to notify that the first sidelink data has been correctly received;
   the terminal device sending, to a network device, the acknowledgement information for first sidelink data; and
   the terminal device receiving first information from the network device, wherein the first information is used for instructing the terminal device to retransmit the first sidelink data;
   wherein the terminal device does not retransmit the first sidelink data when the first information is received;
   wherein the method further comprises:

the terminal device sending the acknowledgement information to the network device; or the terminal device sending second sidelink data to the another terminal device, wherein the second sidelink data is different from the first sidelink data;

wherein the first information comprises downlink control information (DCI), wherein the DCI carries a first HARQ process ID, the first HARQ process ID corresponds to the first sidelink data, and a new data indicator (NDI) carried by the DCI is not toggled;

wherein the terminal device carries a third HARQ process ID in SCI corresponding to the second sidelink data, and a NDI carried in the SCI is toggled;

wherein there is a second mapping relationship between the third HARQ process ID and the first HARQ process ID, and the third HARQ process ID is different from the first HARQ process ID.

4. A non-transitory computer-readable storage medium for storing a computer program, wherein the computer program enables a computer to perform the steps of the sidelink data transmission method claimed in claim 1.

5. A terminal device, comprising:

a transmitter, which is configured to:

send first sidelink data to another terminal device; and send acknowledgement information for the first sidelink data to a network device;

a receiver, which is configured to:

receive the acknowledgment information for the first sidelink data from the another device, wherein the acknowledgement information is used to notify that the first sidelink data has been correctly received; and receive first information from the network device, wherein the first information is configured to instruct the terminal device to retransmit the first sidelink data;

wherein the transmitter is further configured to not to retransmit the first sidelink data when the first information is received, wherein the transmitter is further configured to:

send the acknowledgement information to the network device; or send second sidelink data to the another terminal device, wherein the second sidelink data is different from the first sidelink data;

wherein the first information comprises downlink control information (DCI), wherein the DCI carries a first HARQ process ID, the first HARQ process ID corresponds to the first sidelink data, and a new data indicator (NDI) carried by the DCI is not toggled;

wherein the terminal device carries a second HARQ process ID in sidelink control information (SCI) corresponding to the second sidelink data, and a NDI carried in the SCI is toggled;

wherein there is a first mapping relationship between the second HARQ process ID and the first HARQ process ID, and the second HARQ process ID is different from the first HARQ process ID.

6. The terminal device according to claim 5, wherein the transmitter is further configured to send acknowledgement information for the second sidelink data to the network device when the second sidelink data is correctly received by the another terminal device;

wherein the transmitter is further configured to send negative acknowledgement information for the second sidelink data to the network device when the second sidelink data is not correctly received by the another terminal device.

* * * * *